United States Patent

[11] 3,534,646

| [72] | Inventor | Clarence C. Tyer, Jr. |
| | | 4233 Prospect Drive, Carmichael, |
| | | California 95608 |
| [21] | Appl. No. | 742,587 |
| [22] | Filed | July 5, 1968 |
| [45] | Patented | Oct. 20, 1970 |

[54] FIBER GLASS BOARD CUTTING MACHINE
3 Claims, 11 Drawing Figs.

[52] U.S. Cl. .................................................. 83/5,
83/552, 83/581, 83/614
[51] Int. Cl. .................................................. B26d 3/06
[50] Field of Search ........................................ 83/5, 9, 11,
648, 581, 477, 614, 549, 552; 143/6 – 1, 47 – 6

[56] References Cited
UNITED STATES PATENTS

| 532,822 | 1/1895 | Saltzkorn et al. ............ | 83/5 |
| 611,238 | 9/1898 | Drinkaus ..................... | 83/581X |
| 1,838,011 | 12/1931 | Peter .......................... | 83/614X |
| 2,305,339 | 12/1942 | Deutscher .................... | 83/614X |
| 2,602,474 | 7/1952 | Truchan ...................... | 143/6(1)UX |
| 2,627,880 | 2/1953 | Johnson ...................... | 143/6(1)UX |
| 3,242,780 | 3/1966 | Ried et al. ................... | 83/5 |

*Primary Examiner* — Frank T. Yost
*Attorney* — John J. Randolph

ABSTRACT: A manually operated machine for cutting fiber glass boards to be formed into short lengths of air ducts or air duct portions. A slidably movable carrier for the cutting blades is angularly adjustable for making the necessary cuts in the fiber glass boards at various angles either crosswise or lengthwise of the board to enable the board, after being cut, to be utilized to form transitions or other fittings or parts thereof.

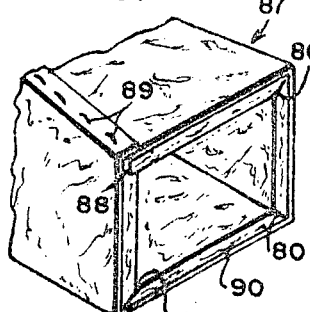
FIG. 10.
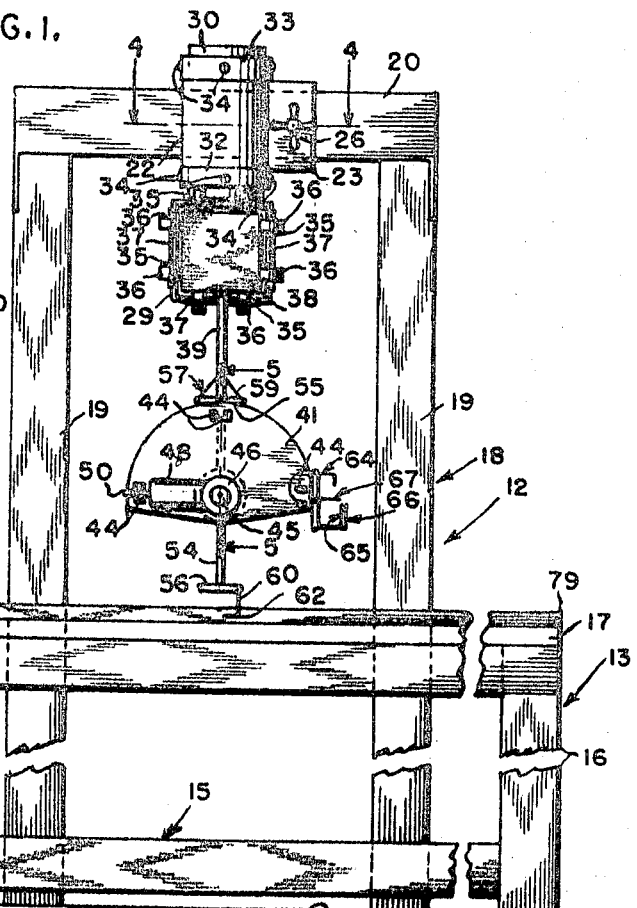
FIG. 1.
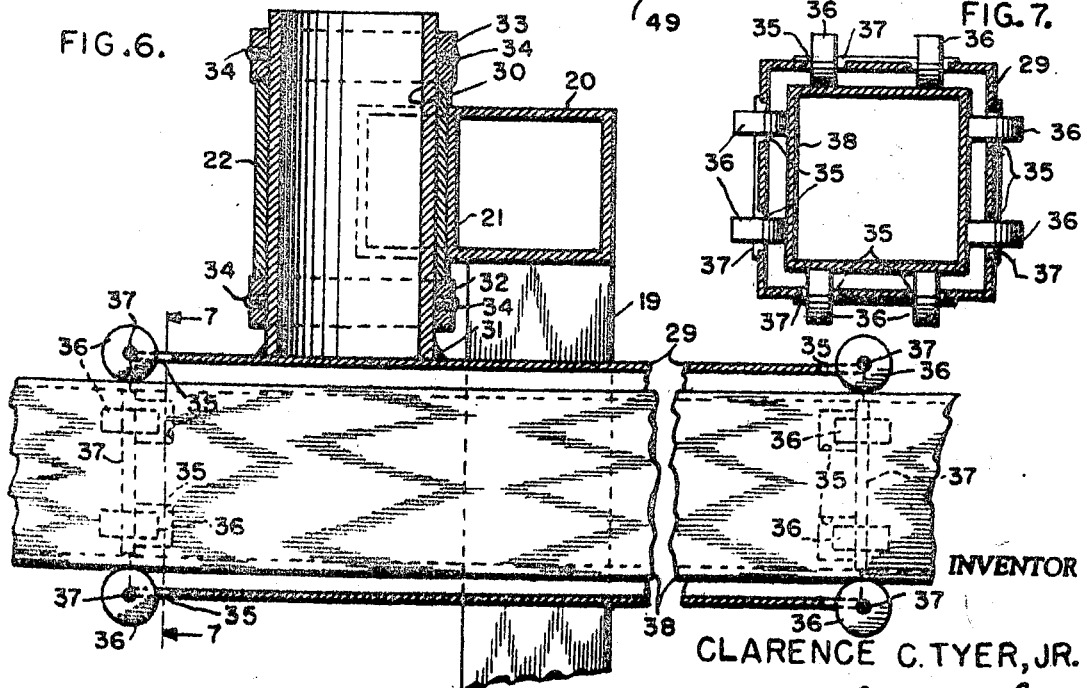
FIG. 6.
FIG. 7.
INVENTOR
CLARENCE C. TYER, JR.
BY John N. Randolph
ATTORNEY INVENTOR
CLARENCE C. TYER, JR.
BY John N. Randolph
ATTORNEY Patented Oct. 20, 1970
3,534,646
Sheet 3 of 3
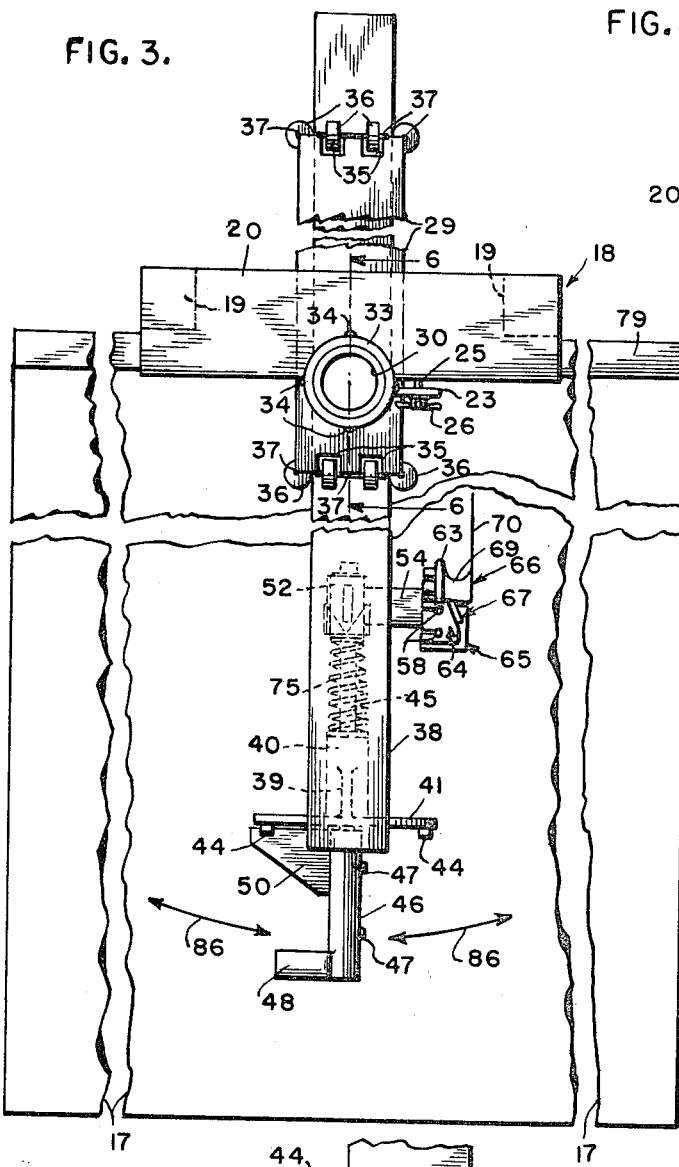
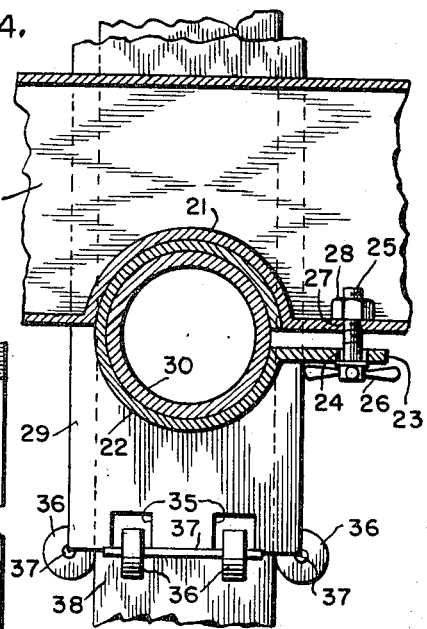
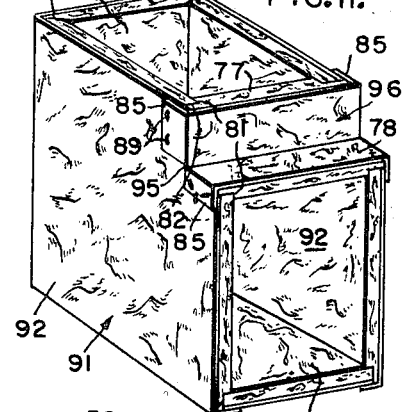
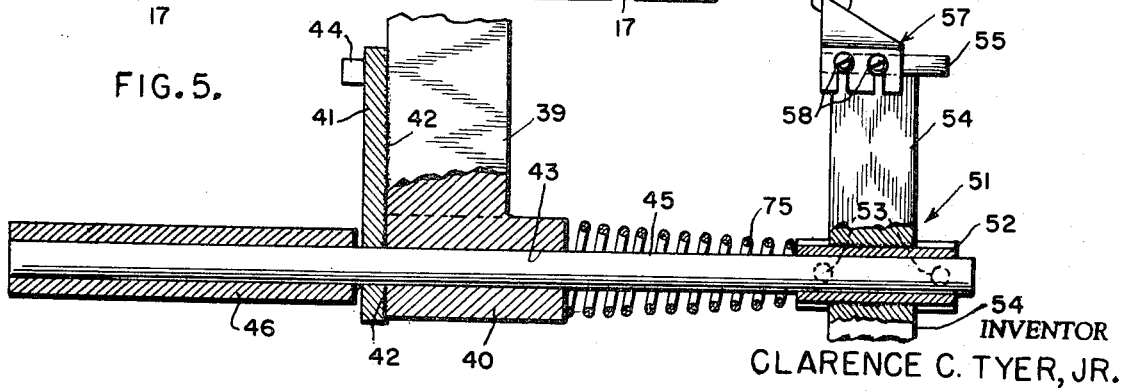
INVENTOR
CLARENCE C. TYER, JR.
BY *John N. Randolph*
ATTORNEY

FIBER GLASS BOARD CUTTING MACHINE

CROSS REFERENCE TO RELATED APPLICATION

The present invention utilizes the same cutting blades as disclosed in my prior application, Ser. No. 720,077, filed Apr. 10, 1968, now U.S. Pat. No. 3,515,019 and entitled Machine for Cutting Fiber Glass Boards to Form Ducts.

SUMMARY

It is a primary object of the present invention to provide a manually actuated machine for cutting short lengths of fiber glass boards to form short lengths of ducts or parts thereof and for cutting fiber glass board to be utilized for forming transitions and other fittings.

More particularly, it is an object of the present invention to provide a machine including a cutting head for mounting a plurality of blades and sets of blades and which may be readily adjusted manually for positioning the different blades and sets of blades in an operative position for making the required cuts in the fiber glass board.

Another object of the invention is to provide a machine including a slidably mounted carrier for the blade support and with which said blade support is movable to execute the cutting strokes.

Another object of the invention is to provide a guide in which the carrier is slidably mounted and guided to accurately move the blade or blades across the board for executing the cutting strokes.

Still a further object of the invention is to provide means for vertically adjusting the guide to adjust the elevation of the cutting blade or blades relative to the board to be cut, and additional means for angularly adjusting the guide and for clamping the guide in different angularly adjusted positions, for making different angular cuts required to form transitions and other duct fittings.

Other various objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a fragmentary front elevational view of the machine;

FIG. 3 is an fragmentary top plan view of the machine;

FIG. 4 is an enlarged fragmentary horizontal sectional view, taken substantially along a plane as indicated by the line 4-4 of FIG. 1;

FIG. 5 is an enlarged fragmentary longitudinal sectional view, taken substantially along a plane as indicated by the line 5-5 of FIG. 1;

FIG. 6 is an enlarged vertical sectional view, taken substantially along a plane as indicated by the line 6-6 of FIG. 3;

FIG. 7 is a cross-sectional view taken substantially along a plane as indicated by the line 7-7 of FIG. 6;

FIG. 10 is a fragmentary perspective view showing one end of a transition formed from a piece of fiber glass board cut by the machine; and FIG. 11 is a perspective view of a fitting constructed of fiber glass boards cut by the machine.

DESCRIPTION OF THE PREFERRED EMBODIMENT

Figure 2:
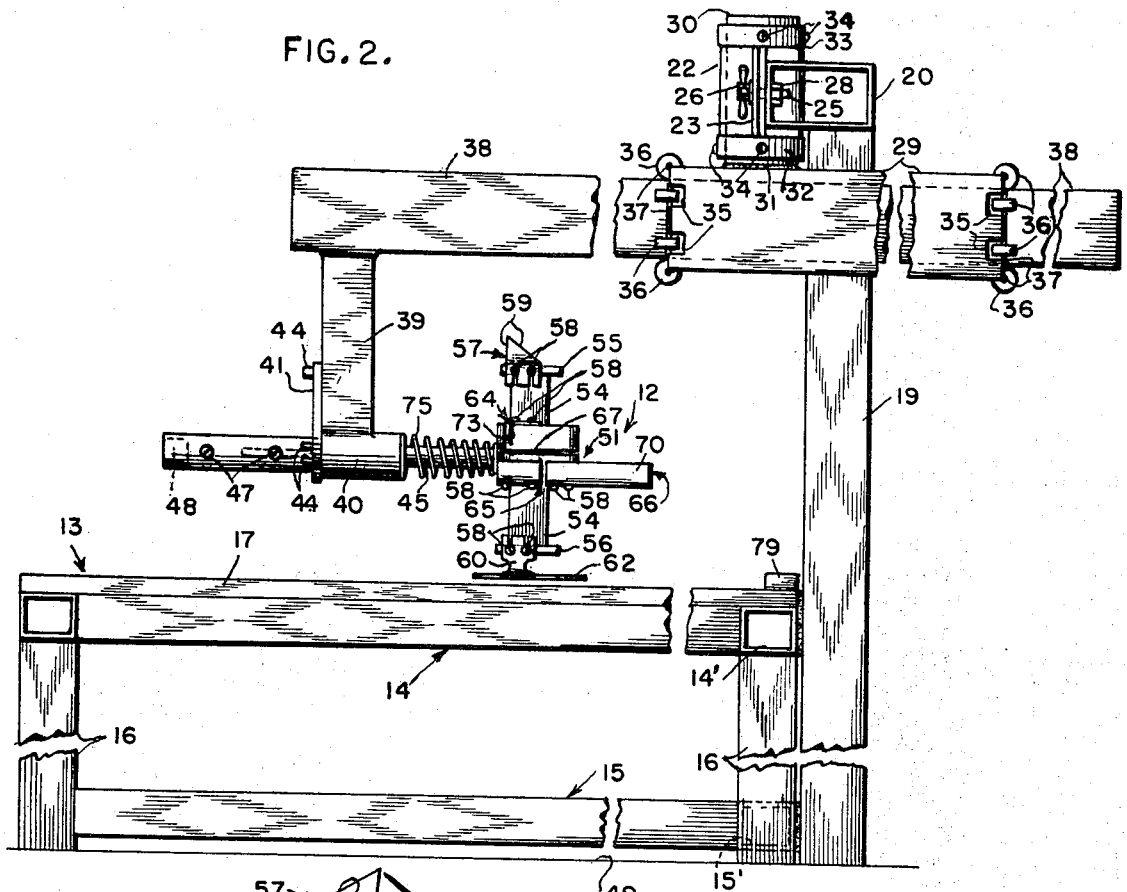
FIG. 2 is a fragmentary side elevational view thereof.

Referring more specifically to the drawings, the fiber glass board cutting machine in its entirety is designated generally 12 and includes an elongated table, designated generally 13, which includes a rectangular top frame 14, a rectangular bottom frame 15, corner legs 16 which are secured to the corners of the frames 14 and 15, and a flat table top 17 which is mounted on and secured to the top frame 14. The parts forming the frames 14 and 15 and the legs 16 are preferably of rectangular tubular metal construction.

An arch-shaped supporting frame, designated generally 18, includes spaced apart upright posts 19 the lower ends of which are disposed in the same plane as the lower ends of the legs 16 to rest on a floor 49 or other supporting surface of the table 13. The frame 18 is disposed behind the table 13 and is rigidly connected in any conventional manner to the rear members 14' and 15' of the frames 14 and 15, respectively. The frame 18 includes an horizontal top crossmember 20 which spans the upper ends of the uprights 19 and which is secured immovably thereto. The frame parts 19 and 20 are likewise preferably formed of rigid tubular metal of rectangular cross section.

As best seen in FIGS. 4 and 6, an intermediate portion of the member 20 has an arcuate, forwardly facing recess 21 in which is secured one end of a split sleeve 22, the other end 23 of which is turned outwardly to extend along a portion of the forward side of the member 20. Said sleeve end 23 is spaced from the member 20 and has an opening 24 to accommodate the shank of a screw 25 having a head 26 defining a handle by which the screw may be manually turned. The screw 25 extends through an opening 27 in the front wall of the member 20 and threadedly engages through a nut 28 which is immovably secured to the inner side of said wall, so that when the screw is advanced through the nut 28 the head 26, which bears against the sleeve end 23, will force said sleeve end toward the member 20 to restrict the sleeve 22.

A carrier guide 29 of tubular construction and rectangular cross section has a tubular post 30 welded or otherwise secured rigidly to its upper side, as seen at 31, and which extends upwardly therefrom through the sleeve 22. Collars 32 and 33 are adjustably secured on the post 30 by setscrews 34 and bear against the lower and upper ends, respectively, of the sleeve 22 for supporting the guide 29 therebeneath and beneath the member 20. The four sides of the guide 29 are provided with outwardly opening notches 35 at both ends thereof to accommodate small wheels or rollers 36 which are journaled on axles 37, secured to the guide 29. Portions of the peripheries of the wheels 36 extend into the guide 29 to engage the four sides of an elongated carrier 38, an intermediate portion of which extends through the guide 29, and which is supported for free reciprocating movement therethrough on the wheels 36. The carrier 38 is of the same cross-sectional shape as the guide 29 but of smaller size and is likewise preferably of tubular construction.

A hanger 39 is secured to and extends downwardly from the carrier 38, adjacent its forward end, and has a bearing or sleeve 40 at its lower end which is disposed above and spaced from the table top 17, in a plane parallel thereto and to the carrier 38 and which has its longitudinal axis disposed to extend in the same direction as the longitudinal axis of the carrier. A latch plate 41 is secured, as by welding, as seen at 42 in FIG. 5, to the forward end of the bearing 40 and the forward edge of the hanger 39, and has an opening 42 which aligns with the bore 43 of the bearing 40. As seen in FIG. 1, the latch plate 41 has three pairs of lugs 44 projecting from its forward side and which are spaced 90° apart.

A portion of a shaft 45 extends through and is rotatably and slidably mounted in the opening 42 and bore 43. A sleeve 46 is secured by setscrews 47 to a forward portion of the shaft 45, which projects outwardly from the plate 41 and has a laterally projecting handle 48 at its forward end.

A flat plate or flange 50 projects laterally from the sleeve 46 and has one end disposed adjacent the inner rear end of said sleeve so that a portion of the plate can be positioned to engage between any one of the pairs of lugs 44, as seen in FIG. 1, to latch the sleeve 46 and shaft 45 immovably to the plate 41.

Figure 8:
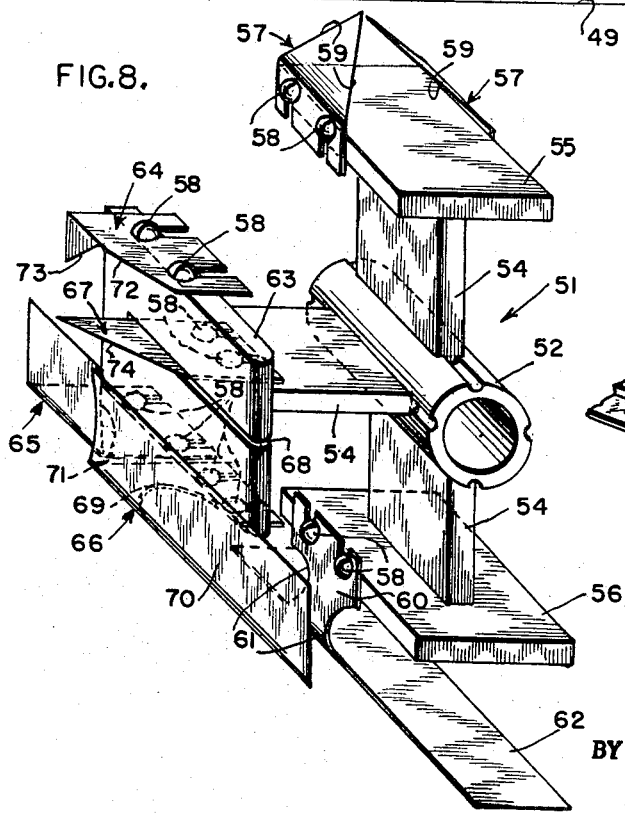
FIG. 8 is an enlarged perspective view showing the blade support and the blades supported thereby.

A blade support 51 includes a hub 52 which is secured immovably to the other end of the shaft 45 by setscrews 53. As best seen in FIG. 8, arms 54 are fixed to and extend radially outward from the hub 52 and are shown spaced 90° apart. The hub 52 is shown provided with three such arms. Corresponding heads 55 and 56 are secured to the outer ends of the aligned arms 54 and are disposed in planes at right angles to said arms. The head 55 supports a pair of corresponding cutting blades 57 which are attached by setscrews 58 to the side edges of said head, and which blades converge toward one another outwardly from the head. Each blade has corresponding cutting edges 59, so that said blades may cut in either direction.

A blade 60 is secured by other screw fastenings 58 to one side edge of the head 56 and has oppositely facing concavely recessed cutting edges 61. A flat shoe 62 is secured to the outer end of the blade 60, is disposed at a right angle thereto outwardly of and parallel to the head 56 and extends in both directions from the side edges of said blade 60 as defined by its cutting edges 61.

The other arm 54 is provided with a head 63, of a somewhat different construction than the heads 55 and 56. A blade 64 is secured by additional fastenings 58 to one side edge of the head 63. Two blades 65 and 66 are secured by additional fastenings 58 to the other side edge of the head 63, and a blade 67 is secured by fastenings 58 against one side of the arm 54, which supports the head 63, and said blade 67 extends outwardly through a slot 68 in the head 63.

The blade 66 is disposed forwardly of the blade 65 and has a forwardly facing concave cutting edge 69, which is disposed parallel to the arm 54 of the head 63, and a flat shoe 70, which is spaced outwardly from and is dispersed parallel to the plane of the head 63. The rear blade 65 has a forwardly facing cutting edge 71 which is disposed in a plane parallel to the plane of the shoe 70, and slightly nearer the head 63 than said shoe 70. The blade 64 has an inclined forwardly facing cutting edge 72, which is disposed in a plane parallel to the cutting edge 69, and a cutting edge 73 which forms an extension of the outer end of the cutting edge 72 and which is disposed perpendicular thereto and parallel to the cutting edge 71, but nearer the head 63 than said cutting edge 71. The blade 67 has an inclined cutting edge 74 which is disposed parallel to the cutting edge 72 and the outer end of which terminates at the plane of the cutting edge 71.

The hub 52 is oriented on the shaft 45 so that when the blade 60 is in a down, operative position, as seen in FIG. 2, with its shoe 62 disposed parallel to the table top 17, the plate 50 will be engaging between one of the pair of lugs 44 for latching the blade support 51 thus positioned. Similarly, when the plate 50 is engaging between the upper intermediate pair of lugs 54 the blades carried by the head 63 will be in the bottommost operative position, and when the plate 50 has been rotated with the shaft 45 and parts carried thereby to engage between the other right hand pair of lugs 44, as seen in FIG. 1, the blades 57 will be disposed in a bottommost operative position. A compression spring 75 is mounted on the shaft 45 between the bearing 40 and hub 52 for urging the shaft 45 and parts carried thereby from left to right of FIG. 5, for retaining the plate 50 between the selected pairs of lugs 44. Thus, the handle 48 must be grasped for displacing the shaft 45 and part carried thereby from right to left of FIG. 5 to disengage the plate 50 from the lugs 44 so that the parts can be rotated for positioning a different blade or set of blades in an operative position.

Figure 9:
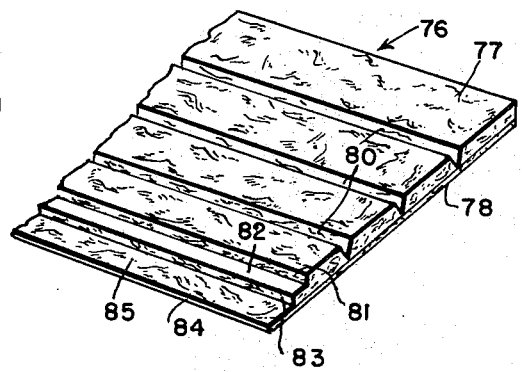
FIG. 9 is a fragmentary perspective view of a portion of a fiber glass board after being cut preparatory to being converted into a duct or a portion of a duct.

The blade 60 constitutes a cutoff blade and is utilized for cutting off an end or side edge of a fiber glass board 76, as seen in FIG. 9. The board 76 is a conventional duct board composed of a thick ply 77 of fiber glass insulation and a thin ply 78 of a metallic material which is secured to one side of the insulation 77. The setscrew 25 and the setscrews 34 are loosened so that the guide 29 and carrier 38 may be displaced downwardly to position the shoe 62 of the blade 60 in contact with the table top 17. The screw 25 is then tightened and the collars 32 and 33 are positioned against the ends of the sleeve 22, after which the setscrews 34 are tightened. The carrier 38 is moved away from the arch 18 so that the board 76 can be positioned on the table top with one edge thereof abutting against a stop or abutment 79 which extends along the rear edge of the table top. The board 76 is positioned so that the blade 60 will align with the part of the board to be cut off. The handle 48 is grasped for moving the carrier 38 rearwardly, from left to right of FIG. 2, so that the leading cutting edge 61 can cut off the board 76 as the shoe 62 travels under the backing strip 78 thereof. The blade 60 may cut in either direction so that this cutting operation could be accomplished with the blade moving away from the stop 79.

If the board 76 is to be cut in a straight line lengthwise or crosswise thereof, the guide 29 is clamped so that said guide and the carrier 38 are disposed crosswise of the arch 18. However, if the board 76 is to be formed into a transition having a taper, the screw 25 can be loosened so that the post 30 can be turned in the sleeve 22 to set the guide 29 and carrier 38 at a desired angle relative to the plane of the arch 18. This swinging movement of the guide and carrier is indicated by the arrow-tipped lines 86 of FIG. 3. With the guide 29 clamped at a desired angle by tightening the screw 25, the aforedescribed cutting operation can be accomplished at the desired angle relative to the longitudinal and transverse axis of the board 76.

The shaft 45 and parts carried thereby can be rotated 180° from their positions of FIGS. 1 and 2 to position the head 55 and blades 57 in a depending operative position, and the guide 29 can be raised slightly in the manner heretofore described so that the points of the cutting edges 59 will be disposed slightly above the table top 17. The carrier 38 is then propelled through the guide 29 by the operator applying a pushing or pulling force to the handle 48 for causing the leading cutting edges of the blades 57 to cut a V-shaped groove 80 in and substantially through the insulation 77. Normally, three such grooves 80 are cut in spaced apart relation to one another. This is accomplished by moving the board 76 on the table top after each groove 80 has been cut. The cuts forming the grooves 80 may be accomplished with the blades 57 traveling in either direction.

The shaft 45 is then turned 90° and latched with the head 63 in a depending position, and the guide 29 is displaced downwardly slightly, as heretofore described, so that the shoe 70 will be in contact with the table top 17. The board 76 is relocated on the table top and a cutting stroke is executed from left to right of FIG. 2 by the blades 64, 65, 66 and 67. The cutting edge 72 will make the cut 81 in the insulation 77, and the edge 73 will make the cut 82. Edge 74 of the blade 67 will cut through the insulation, as seen at 83, without cutting the backing strip 78. The shoe 70 will travel beneath the backing ply 78 and the cutting edge 69 of the blade 66 will cut off the board along the edge 84. The edge 71 of the blade 65 will cut off the insulation between the cut 83 and the edge 84 leaving the exposed flap 85 of the backing ply 78.

It will readily be apparent that these cuts as well as the cuts made by the blades 57 and 60 may be accomplished with the carrier 38 disposed crosswise of the table top 17, as seen in FIG. 3, or at any other angle relative to the arch 18. It will also be apparent that the blades 64, 65, 66 and 67 could be employed for cutting both side edges or both ends of a board 76 rather than only one side edge or one end thereof, as illustrated in FIG. 9. The blades carried by the head 63 can only cut in one direction, from left to right of FIG. 2 when positioned as seen in this view. However, the blade support 51 could be reversed on the shaft 45 to enable said blades to cut while traveling away from the abutment 79.

FIG. 10 illustrates an end of a transition 87 formed from a board 76 in which three cuts 80 and one cut executed by the blades of the head 63 have been made, and with the cuts accomplished while the carrier 38 was set at an angle to the arch 18 different from its right angular position thereto, as illustrated in FIG. 3. The board 76 is folded with the three cuts 80 forming three corners of the transition 87. The edge 88 of the board, initially cut off by the blade 60, fits into the right angular notch formed by the cuts 81 and 82 and the exposed flap 85 is folded thereover and secured in any suitable manner as by staples 89. It will be apparent that two opposite side walls of the transition 87 diverge from its open end 90 toward the other end thereof, not shown, while the other two opposite walls converge away from the end 90 toward said other end, so that the other end will be of different rectangular size and shape than the end 90.

FIG. 11 illustrates a fitting 91 having corresponding side walls 92 and an end wall 93 formed by a fiber glass board one longitudinal edge of which is cut by the blades of the head 63 to form a notch 81, 82 and a flap 85, and which board is provided with two V-shaped cuts 80 made crosswise of the cuts forming the notch 81, 82 and flap 85, so that when the board is folded the cuts 80 will form two corners between the sides 92 and end 93. An uncut bottom member 94 has one end and its side edges engaging in the notches 81, 82. The flap 85 along the bottom edges of the side walls 92 and end wall 93 is folded under said side edges and end of the bottom 94 and is secured thereto in any conventional manner, as by staples, not shown. The upper corners of the walls 92, remote from the corners 80, are notched out, as indicated at 95, to receive a right angular piece of fiber board 96 the insulation 77 of which is cut through longitudinally thereof so that the backing ply 78 can be folded to form substantially a right angle. The two ends of the member 96 are cut by the blades of the head 63 to form notches 81, 82 to receive the notched edges of the walls 92, and flaps 85 are folded outwardly thereover and secured by staples 89. It will be readily apparent that numerous other types of transitions and fittings may be formed by cutting fiber glass boards with the machine 12.

I claim:

1. A machine for cutting fiber glass board to form an air duct including a transition or other fitting or a portion thereof comprising, a supporting surface on which a piece of fiber glass board is adapted to rest, a carrier guide, means supporting said carrier guide above and parallel to said surface, a carrier supported by and reciprocably movable through said guide, a blade support, means mounting said blade support on said carrier and therebeneath for movement with the carrier over said supporting surface, at least one blade mounted on said blade support for executing a cut in the board as the blade is moved with the carrier relative to said surface, said means mounting the blade support including a rotatably mounted part on which the blade support is mounted, said blade support having a plurality of heads spaced from the axis of rotation of said rotatably mounted part, said heads being circumferentially spaced from one another, a plurality of blades supported by certain of said heads, each of said heads supporting a blade or blades for executing different cuts in the board, and the blades of the head or heads, supporting a plurality of blades, functioning simultaneously to execute cuts in the board when the head thereof is disposed in a depending operative position and the carrier is manually propelled through the guide.

2. A machine as in claim 1, and means for latching said rotatably mounted part immovably to the carrier with the different heads of the blade support in depending operative positions.

3. A machine for cutting fiber glass board to form an air duct including a transition or other fitting or a portion thereof comprising, a supporting surface on which a piece of fiber glass board is adapted to rest, a carrier guide, means supporting said carrier guide above and parallel to said surface, a carrier supported by and reciprocably movable through said guide, a blade support, means mounting said blade support on said carrier and therebeneath for movement with the carrier over said supporting surface, at least one blade mounted on said blade support for executing a cut in the board as the blade is moved with the carrier relative to said surface, said machine including a table having a table top constituting said supporting surface for the board, said carrier guide supporting means including a supporting structure fixed to and rising from one side of the table, said supporting structure including a clamping sleeve, a post fixed to and rising from the carrier guide and extending through said sleeve, said post being turnable in the sleeve for angularly adjusting the guide relative to said supporting structure, said post being held nonrotatably in the sleeve when the sleeve is tightened to clamp the post for retaining the guide in selected angularly adjusted positions, and collars adjustably secured to the post above and beneath the sleeve and bearing thereagainst for varying the elevation of the guide and carrier relative to the table top.